United States Patent [19]

Caporiccio et al.

[11] Patent Number: 4,757,145

[45] Date of Patent: Jul. 12, 1988

[54] FLUOROPOLYETHERS CONTAINING END GROUPS ENDOWED WITH ANCHORING CAPACITY

[75] Inventors: Gerardo Caporiccio, Milan; Ezio Strepparola, Bergamo; Mario A. Scarati, Milan, all of Italy

[73] Assignee: Montedison S.p.A., Milan, Italy

[21] Appl. No.: 31,180

[22] Filed: Mar. 26, 1987

Related U.S. Application Data

[63] Continuation of Ser. No. 687,729, Dec. 31, 1984, abandoned.

[30] Foreign Application Priority Data

Jun. 19, 1984 [IT] Italy ................. 21480 A/84

[51] Int. Cl.[4] ............ C07D 471/04; C07D 277/60; C07D 263/52; C10M 105/08
[52] U.S. Cl. ..................... 546/81; 548/152; 548/217; 568/593; 568/601; 568/607; 568/609; 568/610; 568/611; 252/47; 252/51.5 R
[58] Field of Search ............ 568/593, 601, 607, 608, 568/610, 611; 546/81; 548/152, 217

[56] References Cited

U.S. PATENT DOCUMENTS

| | | | |
|---|---|---|---|
| 3,564,059 | 2/1971 | Sianesi et al. | 568/593 X |
| 3,665,041 | 5/1972 | Sianesi et al. | 568/601 |
| 3,810,874 | 5/1974 | Mitsch et al. | 568/601 X |
| 4,178,465 | 12/1979 | Caporiccio et al. | 568/601 |

OTHER PUBLICATIONS

Pavlath et al, Aromatic Fluorine Compounds (1962) 50.

*Primary Examiner*—Howard T. Mars
*Attorney, Agent, or Firm*—Stevens, Davis, Miller & Mosher

[57] ABSTRACT

Compounds suitable for being used as lubricants, having general formula:

(I) $RO-(C_3F_6O)_m-(CFXO)_n-CFX-L$, or (II) $R''CFXO-(C_3F_6O)_x(CFXO)_y-(C_2F_4O)_z-CFX-L$, where
$R = -CF_3, -C_2F_5, -C_3F_7$
$X = F, -CF_3$
$R'' = F, -CF_3, -C_2F_5$
m = an integer from 3 to 100
n = a finite integer, or = zero, wherefore m+n ranges from 3 to 100, provided that, if n is finite, m/n ranges from 5 to 20 and R is preferably = $CF_3$, if n=zero, R is preferably $-C_2F_5$ or $-C_3F_7$
x = a finite integer, or = zero
y, z = finite integers, such that x+y+z ranges from 5 to 200, while (x+z)/y ranges from 5 to 0.5, provided that when x=zero, z/y ranges from 1 to 0.5 and y+z ranges from 5 to 200 n while X is is preferably F, and R''=L
L = group Y-Z,
where:
Y = $-CH_2O-$, $-CH_2-OCH_2$, $-CF_2$, $-CF_2O-$,
Z = a non-aromatic, non-fluorinated organic radical free from activated hydrogen atoms, containing two or more heteroatoms, which are electron doublet donors, or an aromatic radical, either or not containing heteroatoms, capable of giving rise to coordinative bonds or to charge-transfer bonds, thus causing various kinds of adsorption phenomena on metallic, polymeric or ceramic surfaces.

6 Claims, No Drawings

FLUOROPOLYETHERS CONTAINING END GROUPS ENDOWED WITH ANCHORING CAPACITY

This application is a continuation, of application Ser. No. 687,729, filed Dec. 31, 1984, abandoned.

THE PRIOR ART

It is known to use perfluoropolyethers as lubricants, for example in the field of the video and audio tapes, as well as in the precision mechanical instruments subjected to mechanical wear, and in the electric sector, for the protection of contacts subjected to a highe number of opening-closing cycles.

Perfluoropolyethers used to such purposes are known in commerce under the trade name "Fomblin" (of Montedison) and Kyrtox (Du Pont), and are described for example in U.S. Pat. Nos. 3,242,218; 3,665,041 and 3,715,378.

Improvements in the lubricating properties of the perfluoropolyethers were achieved, according to what is described in U.S. Pat. Nos. 4,268,556 and 4,267,238, by introducing, into the perfluoropolyethereal chain, end groups of polar and reactive nature, of the type $-CH_2OH$, $-COOR$, $-CONH-R$, $-CO-CF_3$, which should assure a better adhesion of the perfluoropolyethereal compound to the surface to be lubricated.

However, such modification involves the drawback of a high reactivity of the intermediate groups, some of which, for example, easily hydrolize with formation of acid groups which react with the materials, especially with the metallic ones, of the surfaces onto which they are laid, thus altering them.

THE PRESENT INVENTION

One object of the present invention is a new class of compounds having the structure of perfluoropolyethers, which exhibit better lubricating properties as well as better protective properties than the perfluoropolyethers used so far, and which at the same time are free from the drawbacks described hereinbefore. As a general structure, such compounds consist of a perfluoropolyethereal chain, characterized by the presence of proper organic end groups.

A further object of the present invention is the process for the manufacture of the above said compounds.

Such compounds can be represented by one of the following general formulas (I) and (II):

(I) $R-O-(C_3F_6O)_m(CFXO)_n-CFX-L$ in which the groups $(C_3F_6O)$ and $(CFXO)$ are randomly distributed in the chain, and where:
R may be one of the groups: $-CF_3$, $-C_2F_5$, $-C_3F_7$,
X may be F or $-CF_3$,
m = a finite number ranging from 3 to 100,
n = a finite number or a number equal to zero, wherefore m+n ranges from 3 to 100, and preferably from 5 to 50, extremes included, provided that, when n is finite, the ratio m/n ranges from 5 to 20, extremes included, and R is preferably group $-CF_3$, while when n=0, R is preferably one of the groups $-C_2F_5$ or $C_3F_7$.

(II) $R''CFXO-(C_3F_6O)_x-(CFXO)_y-(C_2F_4O)_zCFX-L$, where groups $(C_3F_6O)$, $(CFXO)$ and $(C_2F_4O)$ are distributed at random in the chain, and where:
X may be F or $-CF_3$,
R'' may be F, $-CF_3$, $C_2F_5$, provided that group R''CFX contains not more than 3 carbon atoms;
y, z = finite integers;
x = finite integer, or it may be = 0;
x+y+z varies from 5 to 200, and preferably from 5 to 100, extremes included;
the ratio (x+z/y) varies from 5 to 0.5 and preferably from 2 to 0.6, extremes included:
provided, when x=0, the 2/4 ratio ranges from 1 to 0.5, extremes included, while the sum y+z ranges from 5 to 200, extremes included, and X is preferably F, and R''=L.

In general formulas (I) and (II), groups L are organic, non-polymerizable groups, having formula:

(III) Y-Z, wherein:
Y = $-CH_2O-$; $-CH_2-O-CH_2-$, $-CF_2-$, $-CF_2O-$,

Z may be an organic non-aromatic, non-fluorinated radical, free from activated hydrogen atoms, containing two or more heteroatoms, either of like or of different nature, which are electron doublet-donor and are placed in position 1-3, 1-4 or 1-5 in respect of one another, or may be an aromatic radical either or not containing heteroatoms, wherefore such radical Z may give rise to coordinative bonds or to charge-transfer bonds, thus causing absorption phenomena, for example chemiadsorption, electrostatic absorption, adsorption due to π bond (delocalized electron adsorption), on surfaces consisting of, or containing:
(a) a metal or a ion taken from the elements of the series consisting of Al, Fe, Ni, Co, Cr, Cu, Ag, Au, Pt, or from alloys or crystalline aggregates thereof as are obtained from metallurgical or melting processes, or from deposition processes, such as chemical vapor deposition (CVD), under vacuum evaporation, sputtering, electrochemical evaporation, or from sintering processes;
(b) suspension of oxides such as $Fe_2O_3$, $CrO_2$, $Ba(FeO_2)_2$ in polymeric materials;
(c) ceramic materials such as $Al_2O_3$, $BaTiO_3$, $CaTiO_3$;
(d) polymeric materials.

Radicals Z contain, as electron doublets donor atoms, oxygen, nitrogen, sulphur, selenium, phosphorus.

Preferably, radicals Z belong to one of the following classes:

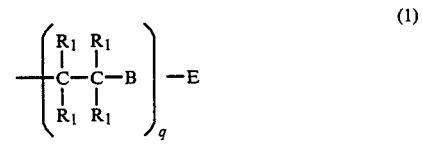

-continued
(2) 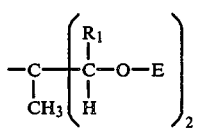
(3) 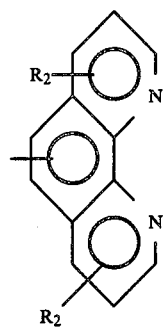
(4) 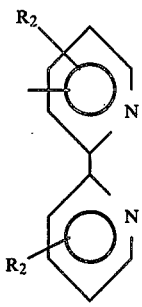
(5) 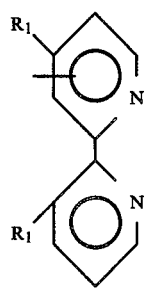
(6) 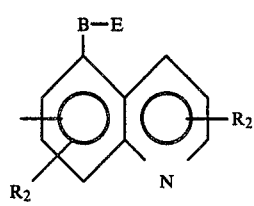
(7) 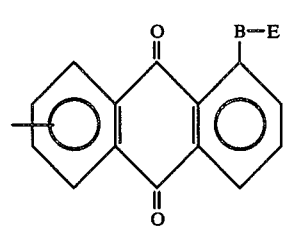
-continued
(8) 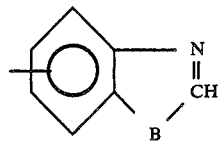
(9) 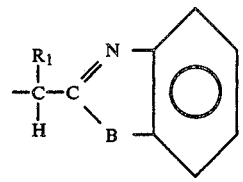
(10) 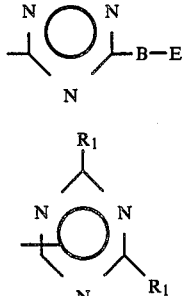
(11) 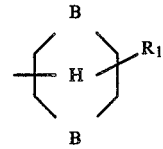
(12) 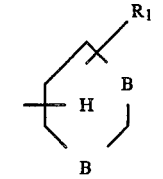
(13) 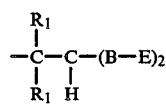
(14) 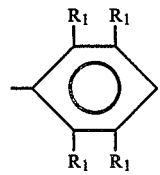
(15) 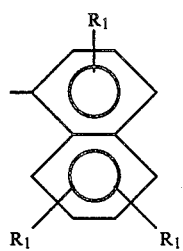
(16)

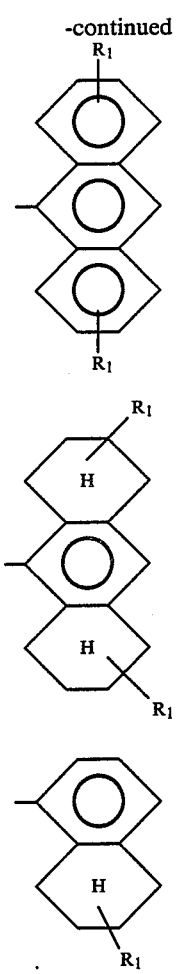

in which:
B = an atom of oxygen or of sulphur,
E = an alkyl containing from 1 to 3 carbon atoms,
$R_1$ = H or an alkyl containing 1 to 3 carbon atoms,
$R_2$ = Cl, Br, H or an alkoxy group of formula E—O-
q = an integer ranging from 1 to 3.

The compounds of formula (I) and (II), in which Z is corresponding to formulas (1), (3), (8), (9), (12), (15), (18) indicated hereinbefore, are the preferred ones.

The compounds of formula (I) and (II), thanks to group L present therein, are endowed with the property of anchoring onto the surfaces of the metals or of the products indicated in groups (a), (b), (c) and (d). Such surfaces may be pure surfaces and directly exposed to the contact with external agents and bodies, or may be coated by thin and discrete layers of protective materials such as resins, amorphous carbon, graphite, etc.

Particular examples of surfaces of the chemical products listed under (a), are the surfaces of steels, bronzes, brasses, also sintered, the surfaces of Sn—Ag, Sn—Au, Sn—Sb alloys, the surfaces of alloys such as Co—Cr, Co—Ni, Fe—Co—Ni, Co—Ni—P, deposited by sputtering or electrochemically, or, finally, the surfaces consisting of metal powders finely dipersed in a polymeric matrix.

Examples of surfaces of the chemical individuals listed under (b) are the surfaces of the materials obtained by spreading suspensions of pigments such as $Fe_2O_3$, $CrO_2$, $Ba(FeO_2)_2$ in polymeric matrices such as polyvinylchloride, polyvinylacetate, or thermosetting materials such as polyurethane or epoxy resins, spread on supports of polyester resins, polyamidic resins, or on metal supports, such as e.g. Al.

Examples of surfaces of chemical individuals listed under (c) are those of ceramic materials of synthetic $Al_2O_3$ type (sapp-hire),—$CaTiO_3$, $BaTiO_3$, usually employed in the manufacture of the recording and/or reading heads on magnetic means or as supports for horology or precision mechanics.

Examples of surfaces of the chemical individuals listed under (d) are synthetic polymers, also of the elastomeric type, such as polyamides, polyimides, polyetherketones, aromatic polyethersulphones, polysulphones, polycarbonates, polyacetals, and in general the technolopolymer utilized for the manufacture of movement members in the mechanical, aeronautical, horology fields, and furthermore the fluorinated, silicone, acryl, nitrilacryl rubbers. In their application as lubricants for such polymers, the products of the present invention may be admixed to the polymers in amounts from 0.5 to 5% by weight, before said calendering, banburizing or extrusion operations, or they may be applicated onto the surface of the polymeric articles ready for use.

The compounds of formula (I) or (II) protect from wear the surfaces coated by them, when such surfaces are subjected to sliding, rolling, tangential or normal forces, or in any case to movements susceptible of continuous or discontinuous repeating contact from other surfaces, which may be made of the same materials as listed under (a), (b), (c). The lubricating action of compounds (I) and (II) is exerted when they are laid onto the abovesaid materials in continuous layers having a thickness ranging from a few tens to a few thousands of Å. Such lubricating action is exerted also on surfaces of synthetic polymers such as those listed under point (d).

In particular, the compounds according to the invention, when deposited on the surface of the chemical individuals listed under (a), are capable of protecting such surfaces from the action of the atmospheric agents even in the presence of a high humidity.

The products of the invention can be used also to promote the permanence on the surfaces of the material listed under (a), (b), (c), (d) of neutral perfluropolyether layers endowed with structure of type ($C_1$), ($C_2$), ($C_3$), as hereinafter specified, which are well known as lubricants endowed with considerable thermal and chemical stabilities. ($C_1$):

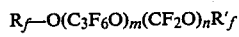

$R_f$—O$(C_3F_6O)_m(CF_2O)_nR'_f$ wherein:
$R_f$ = —$CF_3$, $C_2F_5$, $C_3F_7$,
$R'_f$ = an organic radical either like or unlike $R_f$; m = an integer from 8 to 100, extremes included, n may be like or unlike zero, wherefore, if n = zero, $R_f$ is preferably = $C_3F_7$, while $R'_f$ = $C_2F_5$ or $C_3F_7$; while, if n is different from zero, the m/n ratio ranges from 5 to 20, extremes included, while the sum m+n ranges from 10 to 100, extreme included;

($C_2$): $R''_f$—O—$(C_2F_4O)_p(CF_2O)_qR'''_f$
wherein: $R''_f$ and $R'''_f$, like or unlike each other, may be —$CF_3$ or —$C_2F_5$, the p/q ratio being comprised between 0.5 and 5 and the sum p+q being comprised between 20 and 200, extremes included.

($C_3$): $R''_f$—O—$(C_2F_4O)_r(CF_2O)_s(C_3F_6O)_rR'''_f$

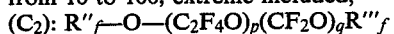

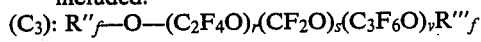

wherein: $R''_f$ and $R'''_f$, like or unlike each other, are the same as in the preceding structure, the r/s ratio varies from 0.5 to 5, the v/r+s ratio varies from 0.01 to 0.4 and the sum v+r+s varies from 10 to 300, extremes included.

The mixtures of the products of formula (I) and/or (II) with the neutral oils of types ($C_1$), ($C_2$), ($C_3$) described hereinbefore may include from 1% to 50% by weight, but preferably from 1% to 10% by weight of products (I) and/or (II).

In such mixtures, the lubricating action is improved for small thicknesses of the layer which are ranging from 5–10 Å to a few thousands of Å, and in sliding or rolling conditions between two surfaces in relative motion, even very rapidly, up to 5–10 Km/min.

The capability of the above-mentioned mixtures of forming thin layers, permanently absorbed on surfaces of type (a), (b) and (c) was determined by vertical spreading measurements carried out by immerging a minor side of a rectangular lamina (15×100×1 mm) prepared from a material of type (a), (b) or (c) into cups containing the lubricating mixtures and by measuring the thickness of the lubricating film which forms in the course of time at different distances from the free surface of the lubricating liquid in the cup. Such thickness can be determined by ESCA analysis, or by FT-IR spectrometry by reflection on the examined surface.

The mechanical resistance of the film consisting of the compounds according to the present invention was checked by interposing proportioned amounts of the compounds between two laminas of the metals listed under (a) and connected to an electric circuit in order to measure the resistance opposed by film to the electric current passage: one of the laminas was subjected to a known load (0.5 kg) and to a reciprocating movement with a 0.5 mm stroke with a known frequency (2–50 Hz). One may notice that the initial infinite electrical resistance remains high after many tens of hours of reciprocating motion when compounds (I), (II) or the 1–50% mixture thereof with the oils listed under ($C_1$), ($C_2$) ($C_3$) are interposed between the metal laminas. The lubrication of parts in continuous or reciprocating motion, carried out by means of the compounds of types (I) and (II), according to the invention, or of mixtures thereof with the perfluoropolyethereal oils of the abovesaid type C, permits to prevent wearing phenomena of sliding, rolling, vibrating parts, or on contacts subjected to repeated opening-closing cycles, thus allowing uniform performances.

The fields particularly interested in the utilization, as lubricants, of compounds (I) and (II) according to the present invention, include the one of the magnetic tapes, that of the electric contactors, that of the ball or roller bearings and of the bushes made of metals or sintered alloys, and in such case also the protective action of compounds (I) and (II) against the atmospheric agent is very effective.

In particular, in the fields of the magnetic means, the surface to protect against the wear due to the contact with the reading head is composed of a film of a magnetic pigment, dispersed in a polymeric matrix, as is described under (b).

The lubricant film based on compounds (I) and (II) according to the present invention, or of mixtures thereof with the perfluoropolyethereal oils of type (C) is applicable by immersion, spreading or spraying of the products as such or of dilute solutions thereof, for example at 0.5–5% of the compounds of lubricating mixtures, in 1,1,2-trichlorotrifluoroethane, whereafter the solvent is caused to evaporate.

The same lubricant application technique is adopted when the magnetic material is of the metallic type, i.e. it is composed of thin layers of metals type Co—Cr, Co—Ni, Ci—Ni—P deposited as described at point (a) on supports, either rigid or flexible, by means of techniques of vacuum evaporation, of sputtering or of electrodeposition.

The lubrication of the magnetic means by means of the compounds of type (I), (II) or of mixtures thereof with the perfluorinated oils of type (C) permits to overcome, in the case of the metal flexible discs, endurance tests of the order of 3–10 millions of passages on the same path by the reading head usually based on synthetic $Al_2O_3$, $BaTiO_3$ or $CaTiO_3$.

The wear resistance of the magnetic tapes was measured by subjecting the tape, whether or not lubricated with the compounds of the present ivention, maintained in reciprocating movement for a stroke of 6,78 cm under the tension of a 226,8 G-force applied over a tape length of 1.27 cm, to the action of a steel ball having a diameter equal to 8 mm and loaded with a 78 g load until observing passage of light through the supporting surface, after the magnetic layer was worn out.

The compounds of structure (I) and (II) and the mixture thereof with perfluorinated oils of type (C) are useful to form thin protective layers, against the sliding or contact wear, on electric contactors, where the parts intended for contact for the electric current passage are made of noble metals, such as Au, Ag, Pt, or of alloys containing Au and Ag.

Also in this case the lubricat film is deposited by immersion or spray with a lubricant solution in 1,1,2-trichlorotrifluoroethane.

In the case of the electromagnetic contactors with nuclei of the laminar type, the compounds of structure (I), (II) and the mixtures thereof with compounds (C) efficaciously dampen the contactor vibrations.

The compounds forming the object of the present invention are useful as lubricants of manufactured articles based on technopolymers subjected to movement and to contact with other surfaces.

Some examples of manufactured articles are gears, porous bushes, sliders, components of ball bearings or of roller bearings.

The compounds object of the present invention can be usefully included also in the formulation of greases consisting of suspending liquids of apolar nature, and of thickening agents consisting of polymeric organic materials or of inorganic materials.

The effect of compounds having structure (I) and (II) is that the enhancing the mechanical stability of the greases, of reducing the oil leakage during the work, of increasing the antiwear effect. Examples of greases which can be improved by the compounds forming the object of this invention, used in percentages of from 0.1 to 2%, are the greases formulated with mineral, silicone or perfluorpolyethereal oils and thickened with PTFE, TEF-EFP (FEP) copolymers, silica, graphite, $MoS_2$, betonites.

The compounds of formula (I) and (II), which are the object of this invention, are preparable starting from known compounds having respectively the structure:
($D_1$): $RO(C_3F_6O)_m(CFXO)_nCFX$-K
($D_2$): $R''CFXO(C_3F_6O)_x(CFXO)_y(C_2F_4O)_zCFX$-K where R, R", X, m, n, x, y, z have the values indicated hereinbefore, and R" may be also equal to K, and in which K is a functional group of the type —COOM (M=H, CH₃)
—CHO
—CH₂OH
—COCl
—COF
—CH₂OCH₂—COOR₁ (R₁=H, or an alkyl containing from 1 to 3 carbon atoms)

by reaction with compounds of formula D-Z, wherein Z has the meaning already indicated and D is a functional group capable of reacting with group K to give Y.

The compounds in which Y=—CH₂O— are obtained from the compounds of formula D₁ or D₂, where K=—CH₂OH, by condensation in an alkaline medium with ethylene epoxides or episulphides, optionally substituted, according to known condensation techniques.

The compounds in which Y=—CH₂OCH₂— are still usually obtainable from hydroxymethyl precursors by alkaline condensation with compounds containing a chloro- or bromo-methylated aromatic ring in group Z. Examples of such compounds are: 2-chloromethyl antraquinones substituted by groups —BE; 5-chloro-, or 5-bromomethyl-benzooxazole or -benzothiazole. In other cases they are obtainable from precursors containing K=—CH₂OCH₂COOH by treatments with aryl-derivatives containing two functionalities in ortho position such as —NH₂ and OH, —NH₂ and OH, —NH₂ and —SH.

The compounds in which Y=—CF₂— are obtained by reacting compounds of formula D₁ or D₂, where K=—COCl or —COF, with products DZ where D is a metal of the type Li, Mg, Cu, in conditions which are known for the obtainment of ketonic compounds of formula D₁—CO—Z or D₂—CO—Z, then effecting the conversion of group =C=O to —CF₂— with HF/SF₄ mixtures, under temperature conditions of from 120° to 180° C. and at pressures from 20 to 60 atm., with reaction times of 20-25 hours, following under the infrared spectrophotometer the disappearance of the absorption due to the =CO group.

For compounds in which Y=—CF₂O— there is used the fluorination method with SF₄/HF mixtures of the corresponding esters (prepared starting from compounds of formula, D₁ or D₂, wherein K=—COOH, —COO—alkyl or —COCl by reaction with compounds of formula ZOH) according to the modalities described hereinbefore in order to obtain the groups —CF₂— from ketone compounds.

The following examples are given to illustrate the present invention without being however a limitation thereof.

EXAMPLE 1

53 g of an alcohol having formuls

CF₃O(C₃F₆O)ₘ(CF₂O)ₙCF₂CH₂OH in which the ratio m/n=5, and having a molecular weight of 1062, were added to a solution consisting of 5.6 g of potassium ter.butylate in 150 cc of ter.butyl alcohol, maintained at a temperature of 30° C. The solution was stirred for 1 hour, then 12 g of 5-chloromethyl-1,10-phenanthroline were added thereto, allowing to react for 3 hours. The mixture was then poured into 300 cc of water and extracted with 150 cc of 1,1,2-trichlorotrifluoroethane. The extracted solution was dried by evaporation, thus obtaining 55 g of product, which, subjected to the infrared and the N.M.R. examination, exhibited the following structure:

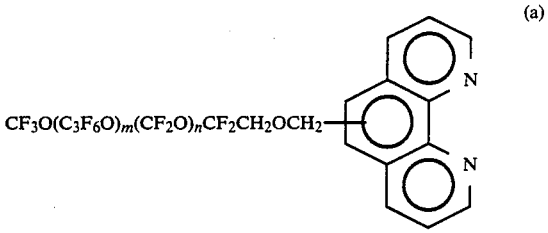

(a)

A solution at 1% by weight of such product in 1,1,2-trichlorotrifluoroethane was used to lubricate, by means of a reverse roll coater, a video tape with a CrO₂ pigment. The thickness of the product laid onto the tape was of about 80 Å. The friction coefficient measured according to ASTM D 1894-73 standards on the tape so coated was of 0.15; the one of the tape as such was of 0.32.

The tape so treated was subjected to an abrasion test by means of a Fulmer abrasion-meter, measuring the wear which occurred on a thin-film sensor.

The abrasion of the treated tape resulted to be 11 times less than the value of the tape as such.

The same product was utilized for lubricating a flexible disc with a magnetic CO—Cr layer obtained by sputtering; the lubricant thickness, as was obtained by immersion into a 1% product solution was of about 250 Å.

The disc was subjected to an endurance test according to ANSI standards, by subjecting it to repeated runs on the same path under the normal use conditions (300 rpm, 10 g of load) and evaluating the worsening of the performances by examination of the envelope of the entire modulation path of the recorded signal.

The tests had always overcome the prescribed limit of three million passages or runs, and the first worsening symptoms could be noticed at about 5 million passages.

EXAMPLE 2

220 g of esters of formula C₃F₇O(C₃F₆O)ₘ—CF₂—COOCH₃, having a M.W. of about 2200 (as determined by N.M.R. analysis), were added to a solution of 8 g of NaBH₄ in 300 cc of ethanol at a temperature of 15°-20° C. and allowed to react, obtaining, after hydrolysis of the boric ester and washing, the corresponding alcohols

C₃F₇O(C₃F₆O)ₘ—CF₂—CH₂OH with a yield of 95%. Such alcohols were solubilized in 100 cc of 1,1,2-trichlorotrifluoroethane and reacted with 2.3 g of NaH at a temperature of 0° C. The resulting mixture was placed into an autoclave, added (by absorption) with 10 g of ethylene oxide and reacted at 50° C. for 5 hours. At the conclusion, the reaction mixture was discharged into a flask and 14 g of dimethylsulphate were added in 2 hours, at 0° C.

The whole was then poured into a water/ice mixture, thus obtaining the separation of the mixture into two layers. From the lower layer, after evaporation of the solvent, about 200 g of a product of formula:

(b)
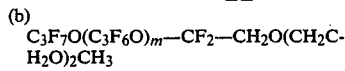

were obtained.

A steel specimen, onto which a 500 Å layer of the product prepared according to this example had been deposited, was subjected to the wear caused by a steel ball moving with reciprocating motion, with a stroke of 0.5 mm and with a frequency of 50 Hz under a load of 0.5 kg. The surface of the specimen and the one of the ball were connected to an electric circuit with controlled resistance. After 20 hours no decrease in the starting value of the electrical resistance was observed.

A test conducted in parallel by using an analogous silicone oil having a viscosity, at 20° C., equal to 200 Cst, revealed after 20 hours a decrease of 75% in the electric resistance.

When using a solution of the product prepared according to this example, a layer of such product having a thickness of 80 Å was deposited on a magnetic tape, with a pigment based on $CrO_2$.

The tape so treated was subjected to the abrasive action of a 8 mm-diameter steel ball, endowed with a reciprocating motion on a 6.78 cm stroke, and loaded by a 78 g force. The tape, having 1.27 cm width, was subjected to a tangential stress of 226.8 g.

After 7000 runs the tape did not let light pass through the magnetic layer subjected to wear. Conversely, the untreated tape let pass the light after 350 of such runs.

A 2% solution of compound (b) in 1,1,2-trichlorotrifluoroethane was utilized to lubricate the surface of a video tape prepared by depositing (according to the high incidence deposition technique) a 0.2μ thick layer of Co—Ni alloy onto a polyester resin film having a thickness of 12μ.

Two tape specimens, one of which was lubricated and the other not lubricated, were subjected to friction coefficient and still frame life comparative tests.

The (dynamic) friction coefficient measured between non-lubricated tape and a slider made of ceramic was equal to 0.55. The same determination on a tape lubricated by the derivative in question revealed a friction coefficient of 0.2. The still frame tests indicated that the non-lubricated tape was not capable of withstanding the still frame running for longer than 10 seconds, while the lubricated tape was capable of running for 5 minutes under the same conditions without serious damages and with an absolutely acceptable drop-out rate.

EXAMPLE 3

150 g of diesters of formula

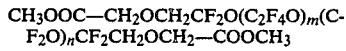

with m/n=0.8 and having a M.W.=8378, as determined by N.M.R. analysis, were added to a solution of 10 g of KOH in 100 cc of ethanol and 50 cc of $H_2O$, and the mixture was heated at reflux under intense stirring.

After 8 hours, the diester hydrolysis was complete. It was diluted with 300 cc of $H_2O$ and it was acidified with HCl in excess, thus causing the precipitation of the diacids corresponding to the diesters. Such diacids (140 g) were then separated by extraction with 300 cc of 1,1,2-trichlorotrifluoroethane and successive evaporation of the solvent.

50 g of such diacids were mixed, under vacuum at 120°-140° C., with 2.8 g of 2-aminothiophenol and were kept under stirring during 3 hours, whereafter vacuum was created in the apparatus, equipped with a cold trap, and the reaction was carried on for further 3 hours at the abovesaid temperature. The mixture was then discharged, after having observed on a sample, by infrared analysis, the disappearance of group C=O.

The product (45 g) was washed with methanol and separated by filtration on a membrane. On infrared and N.M.R. examination, it exhibited the formula:

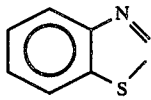C—CH2OCH2CF2O(C2F4O)m(CF2O)nCF2CH2OCH2—C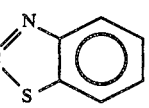 (c)

where m and n have the value defined hereinbefore.

A further amount of 50 g of the diacids prepared as described hereinabove were reacted, under the same conditions employed for preparing the above-described compound, with 2.5 g of 2-aminophenol, thus obtaining 46 g of a compound of formula:

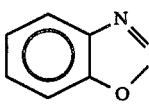C—CH2OCH2CF2O(C2F4O)m(CF2O)nCF2CH2OCH2—C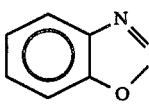 (d)

wherein m and n have the value defined hereinbefore.

1% solutions of the above-described compounds (c) and (d) in 1,1,2-trichlorotrifluoroethane were used to deposit, by immersion, a layer of such compounds, respectively, on floppy disks with pigment based on $Fe_2O_3$ with a polyurethane binder.

The obtained layer has a thickness between 200 and 500 Å, according to the solution extraction rate (which varies from 1 to 10 mm/sec.).

The material was subjected to friction coefficient tests according to standards ASTM D 1894-73, by recording the tangential stress of a ceramic slider by means of a loading cell and a potentiometric recorder.

The results are shown in the following table:

| Compound | static F.C. | dynamic F.C. |
|---|---|---|
| (c) | 0.16 | 0.16 |
| (d) | 0.12 | 0.12 |

The friction coefficinet (F.C.) of the material as such was the following:
static F.C.=0.54
dynamic F.C.=0.38.

The friction, in the presence of functionalized lubricants, proved therefore to be reduced as absolute value and with a higher sliding regularity; furthermore, the differences between static F.C. and dynamic F.C. were much more reduced and not affected by the repeated passages of the slider.

A soft steel lamina of size 3×50×100 mm, polished and cleaned from oil residues, if any, was immersed into product (c) and extracted at a speed of 10 mm/sec. It was allowed to rest during 12 hours, whereafter it was maintained for 28 hours in a non-saline mist at 50° C., with 100% of relative humidity.

At the end of the test the lamina did not exhibit rust traces.

By way of comparison, a lamina treated in the same manner in a fluoroethereal oil, type "Fomblin", having a viscosity of 250 Cst at 20° C., exhibited, at the end of the test, remarkable rusting phenomena.

EXAMPLE 4

55 g of acids of formula
$$CF_3O(C_3F_6O)_m(CF_2O)_nCF_2CH_2OCH_2COOH$$

with m/n=10 and a M.W.=6504 (as from N.M.R. analysis), were reacted at 120°–150° C. under a nitrogen atmosphere with 2.5 g of 2-amino-thiophenol for 3 hours at atmospheric pressure. The reaction was then carried on during 7 hours under vacuum, when, on infrared analysis, the disappearance of the absorption due to group C=O was observed. The product was washed with methanol and the residue was hot filtered on a membrane, thus obtaining 52 g of a compound of formula:

$$CF_3O(C_3F_6O)_m(CF_2O)_nCF_2CH_2OCH_2-C\diagup\!\!\diagdown \text{(benzoxazole)} \quad (e)$$

Into a solution at 2% of such component in 1,1,2-trichlorotrifluoroethane, a polyamide/aromatic imide film, type "Kapton" (produced by DuPont) was immerged, on which, after evaporation of the solvent, the friction coefficient was measured through a ceramic slider, such coefficient being equal to 0.09. The friction coefficient of the film as such was of 0.4.

A second portion of the solution at 2% of such compound, described hereinabove, was used for impregnating under vacuum a bronze porous bushes which, after treatment, was applicated to a pin rotating at a speed of 3000 r.p.m., causing said bush to adhere to a second bush which was free to rotate under a 100 g load. After 3000 of continuous running, no traces of wear could be observed on the treated bush.

By way of comparison, a pair of bushes lubricated with mineral oil, subjected to a similar test, revealed deep wear traces after 900 hours.

When repeating the test with a polyacetal bush treated with a solution of the compound of the example, no wear traces were observable after 2800 hours. Conversely, the same polyacetal bush, lubricated with silicone oil, exhibited, under the same conditions, wear traces after 1200 hours only.

EXAMPLE 5

100 g of alcohols of formula $$CF_3O(C_3F_6O)_m(CF_2O)_nCH_2OH$$

with m/n=20 and a M.W.=5005, as revealed by the N.M.R. analysis, were added to a solution of 2.5 g of potassium terbutylate in 150 ml of terbutyl alcohol, maintained at 30° C.

After a 2-hour stirring, 5.4 g of 9-chloromethylsimoctahydroanthracene.

After 4 hours at 30° C., 150 ml of 1,1,2-trichlorotrifluoroethane and 350 ml of water containing 0.4% of hydrochloric acid were added. The lower layer was separated, which was dried from the solvent. The residual liquid was washed with methanol (2×100 ml), dried by means of a mechanical pump and hot filtered on a membrane. There were obtained 96 g of a limpid liquid which, on I.R. and N.M.R. analyses, revealed to have the formula:

$$CF_3O(C_3F_6O)_m(CF_2O)_nCH_2OCH_2\text{-(octahydroanthracene-H,H)}$$

10 g of such compound were mixed in a mixer equipped with two Z-shaped arms with 3 kg of a perfluoropolyether having the structure $$C_3F_7O(C_3F_6O)_mC_3F_7$$

having a viscosity, at 20° C., of 1500 Cst., and with 450 g of a polytetrafluoroethylene telomer, having a M.W. equal to 30,000.

With 0.2 g of such mixture, a ball bearing having the following dimensions 24×40×8 mm was lubricated. The so lubricated bearing was applied to a rotating element. After a 3000-hour running, the bearing revealed, on optical examination, no traces of wear.

When using, as a lubricant, only perfluoropolyether, the bearing exhibited, after about 1500 hours, vibrations during rotation, while on the surface of the cage and of the balls, a beginning of wear was apparent.

What we claim is:

1. Compounds having the formula:

(I) $-RO-(C_3F_6O)_m-(CFXO)_n-CFX-L$, or (II) $R''CFXO-(C_3F_6O)_x(CFXO)_y-(C_2F_4O)_z-CFX-L$, wherein the oxyalkylene groups are randomly distributed in the chain and where:
   R is $-CF_3$, $-C_2F_5$, $-C_3F_7$;
   X is $-F$, $-CF_3$;
   R'', when x is different from zero, is $-F$, $-CF_3$, $-C_2F_5$ provided that the group R'' CFX contains not more than 3 carbon atoms, and when x is zero is L;
   m is an integer from 3 to 100;
   n is a finite integer, or is 0, wherein m+n is between 3 and 100, provided that, if n is finite, m/n ranges from 5 to 20 and R is $-CF_3$, and if n is zero R is $-C_2F_5$ or $C_3F_7$;

x is a finite integer, or is zero;

y, z are finite integers, such that x+y+z ranges from 5 to 200, while x+z/y ranges from 5 to 0.5, provided that when x is zero, z/y ranges from 1 to 0.5 and y+z ranges from 5 to 200, while X is —F;

L is an organic, non-polymerizable group Y—Z where Y is —CH$_2$O—, —CH$_2$OCH$_2$—, —CF$_2$—, CF$_2$O—; and Z is an aromatic radical comprising at least one aromatic ring either containing or not containing heteroatoms, having 5 or 6 atoms, or at least one ring condensed with said aromatic ring, the group Z being further characterized in that, with metallic, polymeric and ceramic materials, it gives coordination bonds or charge transfer bonds, thus causing adsorption phenomena due to π bond onto the surface of the metallic, polymeric or ceramic material.

2. The compound according to claim 1, in which Z is

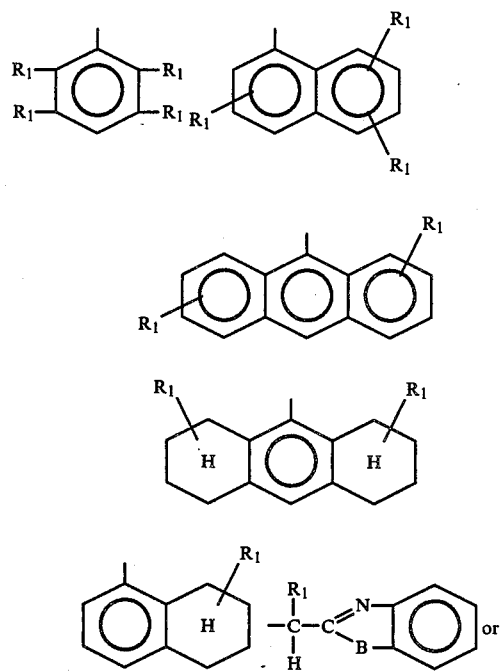

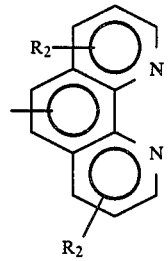

wherein B is oxygen or sulfur, R$_1$ is H or C$_{1-3}$ alkyl, and R$_2$ is H, Cl, Br or C$_{1-3}$ alkoxy.

3. The perfluoroether of the formula:

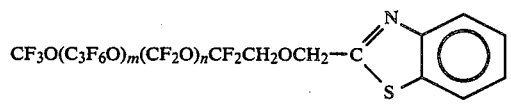

CF$_3$O(C$_3$F$_6$O)$_m$(CF$_2$O)$_n$CF$_2$CH$_2$OCH$_2$—C wherein the oxyalkylene groups are randomly distributed in the chain and wherein:
  m is an integer from 3 to 100;
  n is a finite integer or is 0, wherein m+n is between 3 and 100, provided that if n is finite m/n ranges from 5 to 20.

4. The perfluoroether of the formula

CF$_3$O(C$_3$F$_6$O)$_m$(CF$_2$O)$_n$CF$_2$CH$_2$OCH$_2$— 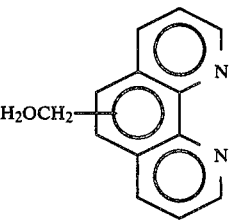

wherein the oxyalkylene groups are randomly distributed in the chain and wherein:
  m is an integer from 3 to 100,
  n is a finite integer or is 0, wherein m+n is between 3 and 100, provided that if n is finite m/n ranges from 5 to 20.

5. Compounds according to claim 1, wherein at least one ring condensed with the aromatic ring of radical Z is cycloaliphatic.

6. Compounds according to claim 1 or 5, wherein said Z group contains substituents selected from the group consisting of C$_1$-C$_3$ alkyl and C$_1$-C$_3$ alkoxy.

* * * * *